United States Patent [19]

Meder

[11] Patent Number: 5,102,967

[45] Date of Patent: Apr. 7, 1992

[54] PROCESS FOR MAKING POLYSILSEQUIOXANE AND POLYMETHYL-N-HEXYLSILSESQUIOXANE COATING COMPOSITIONS AND COATING COMPOSITIONS FORMED THEREBY

[75] Inventor: Martin G. Meder, Hightstown, N.J.

[73] Assignee: General Electric Company, Princeton, N.J.

[21] Appl. No.: 683,934

[22] Filed: Apr. 11, 1991

Related U.S. Application Data

[62] Division of Ser. No. 457,622, Dec. 27, 1989, Pat. No. 5,026,813.

[51] Int. Cl.$^5$ .............................................. C08G 77/00
[52] U.S. Cl. ........................................ 528/10; 528/22; 528/38
[58] Field of Search ................... 528/10, 22, 38; 524/306, 315, 319, 773, 858

[56] References Cited

U.S. PATENT DOCUMENTS

| | | | |
|---|---|---|---|
| 2,465,188 | 3/1949 | Barry et al. | 260/148.2 |
| 3,976,497 | 8/1976 | Clark | 106/287 SE |
| 3,979,344 | 9/1976 | Bryant et al. | 528/22 |
| 4,103,065 | 7/1978 | Gagnon | 428/336 |
| 4,197,230 | 4/1980 | Baney et al. | 260/29.2 M |
| 4,311,763 | 1/1982 | Conroy | 528/18 |
| 4,339,563 | 7/1982 | Takago et al. | 528/22 |
| 4,388,433 | 6/1983 | Klein et al. | 528/22 |
| 4,399,266 | 8/1983 | Matsumura et al. | 528/10 |
| 4,444,973 | 4/1984 | Schonfelder et al. | 528/28 |
| 4,486,503 | 12/1984 | Vaughn, Jr. | 524/837 |
| 4,626,556 | 12/1986 | Nozue et al. | 522/99 |
| 4,746,693 | 5/1988 | Meder | 524/306 |
| 4,810,768 | 3/1989 | Wong | 528/22 |
| 4,889,903 | 12/1989 | Baghdachi | 528/38 |
| 4,894,426 | 1/1990 | Baghdachi et al. | 528/22 |
| 4,954,598 | 9/1990 | Baghdachi et al. | 528/22 |
| 5,026,813 | 6/1991 | Meder | 528/38 |

OTHER PUBLICATIONS

Anthony M. Schwartz et al., "Surface Active Agents and Detergents", Interscience Publishers, Inc., N.Y., 1958, vol. II, pp. 150-152.

Kirk-Othmer, "Encyclopedia of Chem. Tech.", vol. 22, Sulfonation and Sulfation to Thorium and Thorium Compounds, 3rd Ed., John Wiley & Sons, N.Y., 1983, p. 360.

Yeaple; "Anti-Atomic-Oxygen Coating Protects Spacecraft", Design News, Mar. 27, 1989 (2 pages).

1989 R&D 100 Award Winners, "Atomic Oxygen Barrier Coating (Polyalkylsilsesquioxane)", p. 17.

1987, Petrarch Systems "Silanes, Properties and Prices", p. 1, (Contents) and p. 106.

Primary Examiner—John C. Bleutge
Assistant Examiner—Karen A. Hellender
Attorney, Agent, or Firm—E. F. Chapman

[57] ABSTRACT

A process of making an improved coating composition by combining alkyltrialkoxy silanes such as n-hexyltrimethoxysilane and methyltrimethoxysilane, in the presence of a silane catalyst having at least one amino-substituted functional group, at least one alkoxy-substituted group wherein the alkoxy-substituted group has at least 2 carbon atoms in the alkoxy group and optionally, an alkyl group, in an amount of water less than a stoichiometric amount of water. The combined monomer, catalyst and water are ultrasonically agitated to form an emulsion to hydrolyze the silanes to the extent permitted by the amount of water present and to form a moisture-curable coating composition. The coating composition of the present invention is a moisture-curable polymethyl-n-hexylsilsesquioxane having a partially water-hydrolyzed, silane catalyst-containing condensation product of n-hexyltrimethoxysilane and methyltrimethoxysilane, the silane catalyst having at least one aminoalkyl-substituted group and at least one alkoxy-substituted group having at least 2 carbon atoms in the alkoxy group. The silane catalyst is also a co-curing agent and condenses with the n-hexyltrimethoxysilane and the methyltrimethoxysilane.

21 Claims, No Drawings

PROCESS FOR MAKING POLYSILSEQUIOXANE AND POLYMETHYL-N-HEXYLSILSESQUIOXANE COATING COMPOSITIONS AND COATING COMPOSITIONS FORMED THEREBY

This is a division of application Ser. No. 07/457,622, filed Dec. 27, 1989, now U.S. Pat. No. 5,026,813.

FIELD OF THE INVENTION

This invention relates to an improved process for making polysilsesquioxane coating compositions, to polymethyl-n-hexylsilsesquioxane coating compositions and polyalkylsilsesquioxane coating compositions made thereby.

BACKGROUND OF THE INVENTION

Organopolysiloxanes having an atomic ratio of oxygen to silicon of 1.5 are generally called polysilsesquioxanes. These resins are generally utilized as abrasion-resistant coatings particularly on plastic lenses and glazing material. Polysilsesquioxanes have a ladder-like structure represented by the formula

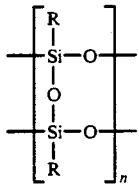

I wherein R is the same or different and is lower alkyl, halolower alkyl, phenyl, substituted phenyl, phenethyl and methylphenethyl, with at least one of the groups represented by R being lower alkyl, and n is an integer. Coating compositions containing such resins are resistant to high temperatures and are hard. The hardness is due to a high degree of cross-linking in the resin.

Disadvantages of the coating compositions containing polysilsesquioxane resins are discussed in U.S. Pat. No. 4,746,693. In U.S. Pat. No. 4,746,693 which is incorporated herein by reference in its entirety, the disadvantages of the prior art coating compositions containing polysilsesquioxane resins are overcome by combining one or more silanes represented by the formula R—Si(OR)$_3$ wherein the groups represented by R are the same or different and are lower alkyl containing 1 to 6 carbon atoms, halolower alkyl containing 1 to 6 carbon atoms, phenyl or substituted phenyl, with the proviso that at least one group represented by R is lower alkyl; an effective amount of a nonvolatile, nonionic catalyst; a nonionic fluorochemical surfactant; and an amount of water representing from about 10 to about 95 mole percent of the moles of silanes present; agitating the mixture to form an emulsion; and maintaining the emulsion for a time sufficient to partially hydrolyze and condense the silanes to the extent permitted by the amount of water present. In U.S. Pat. No. 4,746,693, alkyl silanes are partially condensed to form a stable mixture predominately of dimers and tetramers by emulsion hydrolysis in the presence of a nonvolatile, neutral tin catalyst and a nonionic fluorochemical surfactant. The resulting stable preparation will completely cure upon exposure to atmospheric moisture to form a polyalkylsilsesquioxane resin coating. A novel resin, polymethylisobutylsilsesquioxane, is particularly advantageous in U.S. Pat. No. 4,746,693 for coating applications on space hardware.

Although the polyalkylsilsesquioxane coating compositions of U.S. Pat. No 4,746,693 provide excellent coatings for substrates, for example, for satellites and other space hardware which must be in low earth orbit where they will be subjected to high temperatures, intense UV radiation and atomic oxygen, it is always desirable to improve the properties of such coating compositions. For example, it is desirable to improve the oxidation resistance, the high temperature mass loss properties, adhesion and the curing characteristics. It is also desirable to reduce the number of ingredients in coating compositions and to simplify compounding and processing in the preparation of such coating compositions.

SUMMARY OF THE INVENTION

Accordingly, it is the primary object of the present invention to provide improved polyalkylsilsesquioxane coating compositions.

Another object of the present invention is to provide an improved process for making polysilsesquioxane coating compositions.

Another object of the present invention is to improve the oxidation resistance, the high temperature mass loss properties, adhesion and curing characteristics.

Still another object of the present invention is to provide an improved process for making polysilsesquioxane coating compositions having improved oxidation resistance, high temperature mass loss properties, adhesion and curing characteristics.

Another object of the present invention is to provide an improved process for making polysilsesquioxane coating compositions by using fewer ingredients and simplified compounding and processing techniques.

These and other objects are achieved by combining one or more silane monomers represented by the formula R—Si(OR)$_3$ wherein the groups represented by R are the same or different and are lower alkyl containing 1 to about 9 carbon atoms, halolower alkyl containing 1 to about 9 carbon atoms, phenyl, substituted phenyl, phenethyl or methylphenethyl, with the proviso that at least one group represented by R is lower alkyl; an effective amount of a silane catalyst having at least one amino-substituted functional group, at least one alkoxy-substituted group wherein the alkoxy-substituted group has at least 2 carbon atoms in the alkoxy group, and optionally, an alkyl group; and less than a stoichiometric amount of water, the water preferably representing from about 10 mole percent to about 95 mole percent of the moles of silane monomer present; optionally adding a nonionic fluorochemical surfactant; subjecting the mixture to ultrasonic agitation to form an emulsion; and maintaining the emulsion for a time sufficient to hydrolyze partially and condense the silane monomer to the extent permitted by the amount of water present. When a nonionic fluorochemical surfactant is added to the mixture, the agitation may be carried out by conventional high speed stirring techniques.

In one aspect of the present invention, the objects are achieved by combining n-hexyltrimethoxysilane and methyltrimethoxysilane in the presence of a silane catalyst having at least one amino-substituted functional group and at least one alkoxy-substituted group wherein the alkoxy-substituted group has at least two carbon atoms in the alkoxy group, water and optionally, nonionic fluorochemical surfactant; subjecting the mixture to ultrasonic agitation to form an emulsion; and maintaining the emulsion until the silanes are partially hydrolyzed and condensed to the extent permitted by the amount of water present, the amount of water being less than the stoichiometric amount required to cure completely the silanes. As indicated above, when a nonionic fluorochemical surfactant is added to the mixture, the agitation may be carried out by conventional high speed stirring techniques. The combined silanes are partially condensed to form a stable mixture predominately of dimers, tetramers and oligomers by emulsion hydrolysis in the presence of the amino-substituted catalyst having alkoxy substitution. The resulting stable, partially hydrolyzed, partially condensed silanes completely cure upon exposure to additional moisture, such as atmospheric moisture, to form a cured polymethyl-n-hexylsilsesquioxane resin coating.

In another aspect of the present invention, there is provided a process of making an improved coating composition comprising, combining about 10 mole percent to about 50 mole percent n-hexyltrimethoxysilane and about 50 mole percent to about 90 mole percent methyltrimethoxysilane; an effective amount of a silane catalyst having at least one amino-substituted functional group, at least one alkoxy-substituted group wherein the alkoxy-substituted group has at least 2 carbon atoms in the alkoxy group and optionally, an alkyl group; and amount of water representing from about 10 mole percent to about 95 mole percent of the moles of silane present and optionally, nonionic fluorochemical surfactant; subjecting the mixture to ultrasonic agitation to form an emulsion; and maintaining the emulsion for a time sufficient to hydrolyze partially and condense the silanes to the extent permitted by the amount of water present. As indicated above, when a nonionic fluorochemical surfactant is added to the mixture, the agitation may be carried out by conventional high speed stirring techniques.

In the present invention, the class of amino-substituted silane catalyst having alkoxy substitution not only acts as a catalyst, but also acts as a curing agent by condensing with the monomers, dimers, tetramers and oligomers formed during the condensation, as well as acts significantly in improving the adhesion characteristics of the resulting composition. In essence, polyalkylsilsesquioxanes, including the polymethyl-n-hexylsilsesquioxane coating compositions of the present invention, are co-cured by water hydrolysis and by the aminoalkyl-substituted silanes having alkoxy-substituted groups thereon.

The polysilsesquioxane compositions of the present invention can be applied to almost any substrate and are particularly advantageous for coating applications on space hardware. The improved polyalkylsilsesquioxane coating compositions of the present invention act as an atomic oxygen barrier for low earth orbit spacecraft. The coating resin can be sprayed onto existing satellite hardware and cured at room temperature into a light weight, thin, for example, 0.0001 inch, or less, thick, transparent coating that is scratch resistant and oxidation resistant. The improved polymethyl-n-hexylsilsesquioxane coatings of the present invention protect treated components from atomic oxygen which is an extremely unstable particle formed in low earth orbits, that can completely disintegrate silver interconnects on solar cells within a month. Interconnects coated with the improved coating compositions of the present invention are protected against attack by atomic oxygen. The improved coating compositions of the present invention also have applications as an abrasion-resistant coating for eyeglass lenses, as a nonmoisture-absorbing substitute for polyimide systems in microelectronic coatings and as a protective coating for metals. The improved compositions of the present invention may also be used for waterproofing and fireproofing of paper and fabric, as a non-hygroscopic, high-temperature alternative to polyimides for microelectric or conformal coating and sealing, a non-transferable mold release agent, a high-temperature paint binder and a corrosion-resistant coating for metal.

Although specific details are given herein for combining n-hexyltrimethoxysilane and methyltrimethoxysilane in the improved process of the present invention and the polymethyl-n-hexylsilsesquioxane coating compositions resulting from such combination, the specific details described herein are also applicable to the combination of bulky-substituted trialkoxysilanes which are used in the improved process of the present invention which utilizes the amino- and alkoxy-substituted silane catalysts.

DETAILED DESCRIPTION OF THE INVENTION

In the improved process of the present invention, polysilsesquioxanes are prepared by the hydrolysis/condensation of one or more bulky-substituted trialkoxy silanes represented by the formula $R—Si(OR)_3$ to form a polysilsesquioxane represented by the formula I above and where R is as described above. The term "lower alkyl" as utilized in the above resins has been exemplified by straight-chain groups having 1 to 3 carbon atoms, that is methyl, ethyl and n-propyl, predominately methyl. The term "lower alkyl" as utilized herein includes straight- and branch-chain groups having 1-9 carbon atoms and a significant portion of the groups represented by R have from 4 to 9 carbon atoms. The term halolower alkyl includes lower alkyl groups primarily with fluoro or chloro substitution. A preferred substituent is a 3,3,3-trifluoropropyl group. The term "phenyl" includes phenyl groups, phenethyl groups and methylphenethyl groups. The term, "substituted phenyl" includes phenyl groups substituted with halo, lower alkyl groups having 1-3 carbon atoms and halolower alkyl groups. Certain preferred polyalkylsilsesquioxanes are described in U.S. Pat. No. 4,746,693 and can be made by the improved process of the present invention wherein the unique catalytic compounds not only catalyze the formation of the polymer but also enter into the condensation reaction and become a part of the polymeric structure and significantly improve the adhesion characteristics of the resulting compositions. Thus, the silane catalysts having at least one amino-substituted functional group, at least one alkoxy-substituted group wherein the alkoxy-substituted group has at least 2 carbon atoms in the alkoxy group, and optionally an alkyl group, as used in the process of the present invention become a part of the forming polymer and are an integral part of the polymer of the improved coating compositions.

Preferred compositions of the present invention include improved polymethyl-n-hexylsilsesquioxane coating compositions. They are prepared by the hydrolysis/condensation of n-hexyltrimethoxysilane and methyltrimethoxysilane represented by the formula:

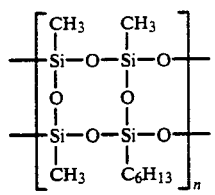

wherein n is an integer.

In the process which forms the polymethyl-n-hexylsilsesquioxane coating composition of the present invention, two monomers, namely, n-hexyltrimethoxysilane and methyltrimethoxysilane, are partially hydrolyzed and condensed in the presence of the silane catalyst of the present invention and water and optionally in the presence of a nonionic fluorochemical surfactant. In preferred embodiments of the present invention, about 10 mole percent to about 50 mole percent n-hexyltrimethoxysilane and about 50 mole percent to about 90 mole percent methyltrimethoxysilane are combined. In the most preferred embodiments of the present invention, about 15 mole percent to about 25 mole percent n-hexyltrimethoxysilane is combined with about 75 mole percent to about 85 mole percent methyltrimethoxysilane.

The improved adhesion of the polymethyl-n-hexylsilsesquioxane coating compositions as well as the improved adhesion of the polysilsesquioxane compositions of the present invention, can be obtained only by reacting or combining the monomer in the presence of an effective amount of a silane catalyst having at least one amino-substituted functional group, at least one alkoxy-substituted group wherein the alkoxy-substituted group has at least two carbon atoms in the alkoxy group and optionally, an alkyl group. In accordance with the present invention, it has been discovered that the alkoxy-substituted group on the silane catalyst does not form the improved compositions of the present invention when the alkoxy- substituted group is a methoxy-substituted group. It has been found that precipitation occurs with the aminoalkyl methoxy-substituted silanes.

In accordance with the present invention, it has been found that the silane monomer, n-hexyltrimethoxysilane is superior to the prior art iso-butyltrimethoxysilane as a bulky-substituent donor because it is more efficient, and a suitably flexibilized coating can be made with one half the amount of bulky substituent, however, the n-hexylalkyl group has 1.5 times the number of carbon atoms as the iso-butyl group. The resulting coating made from the n-hexyltrimethoxysilane monomer of the present invention has a lower total organic content which improves the high temperature mass loss properties of the improved polymethyl-n-hexylsilsesquioxane coating compositions of the present invention. Furthermore, the n-hexylalkyl group has no tertiary carbon in the group while the iso-butyl alkyl group does have a tertiary carbon in the group. Accordingly, the n-hexyl group is more oxidation resistant, and the improved polymethyl-n-hexylsilsesquioxane coating composition of the present invention is more oxidation resistant than the prior art coating compositions. The hydrolyzed n-hexyltrimethoxysilane monomer used in the process of the present invention has more of the character of a surfactant than the iso-butyl alkyl groups of the prior art, and the hydrolyzed n-hexyltrimethoxysilane is believed to have the hydrophilic/hydrophobic character of a surfactant itself. Thus, by using the n-hexyltrimethoxysilane monomer in the process of the present invention, it has been found that the surfactants of the prior art can be omitted or not, as is convenient, from the process of the present invention. Accordingly, surfactant materials normally required by the prior art can be omitted or not, as is convenient, in the process of the present invention, thereby reducing the number of ingredients which must be incorporated into the coating compositions of the present invention. However, when nonionic fluorochemical surfactants as disclosed in U.S. Pat. No. 4,746,693, are combined with the silane monomer, water and amino- and alkoxy-substituted silane catalyst of the present invention, the emulsion may be formed by agitating the mixture by conventional means as described in U.S. Pat. No. 4,746,693 and/or by subjecting the mixture to ultrasonic agitation.

In accordance with the present invention, it has also been found that the silane catalyst having at least one amino-substituted functional group, at least one alkoxy-substituted group and optionally, an alkyl group, not only function as catalyst and co-curing agents, but also as coupling agents. Many of the prior art catalysts, for example, tin soaps (Lewis acids), appear to inhibit the adhesion promoter function of aminosilanes. By the elimination of this type of prior art catalyst, and by the use of the silane catalyst having at least one amino-substituted functional group, at least one alkoxy-substituted group wherein the alkoxy-substituted group has at least two carbon atoms in the alkoxy group and optionally, an alkyl group, it has been found that the polymethyl-n-hexylsilsesquioxane coating compositions of the present invention have improved adhesion. Thus, in accordance with the present invention, the polymethyl-n-hexylsilsesquioxane coating composition has improved adherence to the surfaces of various substrates.

As indicated above, the amino-substituted silanes used as catalysts in the present invention, also act as a co-curing agent in the process and compositions of the present invention. Although there is no intention of limiting the present invention to any theory, most likely, the increased sluggishness of the functional group which splits from the amino ethoxy-substituted silanes, offsets the presence of an autocatalytic group to allow time for the amino alkoxy silane to catalyze the condensation of the methoxy-substituted groups on the n-hexyltrimethoxysilane and methyltrimethoxysilane. It is this particular functional group which results in the unexpected advantage over ordinary amine catalysts, and it has been found that the amino- and alkoxy-substituted silanes, including aminoalkylalkoxysilanes, used in the process and compositions of the present invention ultimately act as a curing agent by condensing with the monomer, dimer, tetramer and other oligomers, and becomes both non-volatile and non-mobile.

Generally, the silane catalyst/co-curing agent/coupling agent used in the process and compositions of the present invention has the formula:

$$(H_2N-R''')_a (R')_{4-a-b}-Si-(OR'')_b \qquad III$$

wherein $R'''$ is an alkyl group having from 1 to about 4 carbon atoms or an amino-substituted functional group; $R'$ is an alkyl group having from 1 to about 4 carbon atoms; $R''$ is an alkyl group having at least 2 carbon atoms; $R'''$, $R'$ and $R''$ can be the same or different; and $a$ and $b$ are each an integer from 1 to 3. The amino-substituted functional group(s) of the silane catalyst can be any aminoalkyl group, aminophenyl group, aminoalkoxy group, or mixtures thereof and include aminoalkyl groups substituted with other alkyl and substituted alkyl groups wherein preferred alkyl groups have from 1 to about 6 carbon atoms, and preferred alkoxy groups have from 1 to about 6 carbon atoms. Examples of certain preferred amino-substituted functional groups represented by R''' include 3-aminopropyl, aminomethyl, 2-aminoethyl, 4-aminobutyl, N-(2-aminoethyl)-3-aminopropyl, 6-aminohexylaminopropyl, p-aminophphenyl, 3-(1-aminopropoxy)-3,3-dimethyl-1-propenyl, diethylenetriamine, aminoethylaminomethylphenyl, and $H_2N—R^4$ where $R^4$ is equal to R'''. Examples of certain preferred silane catalysts include 3-aminopropyldimethylethoxysilane; 3-aminopropylmethyldiethoxysilane; and 3-aminopropyltriethoxysilane.

The optional alkyl group in the silane catalysts used in the present invention may be any alkyl group having from 1 to about 6 carbon atoms and preferably 1 to about 4 carbon atoms. In preferred embodiments of the present invention the silane catalysts generally have 0-2 methyl groups as the optional alkyl group.

There must be at least one alkoxy group having at least two carbon atoms in the silane catalyst used in the present invention. In preferred embodiments of the present invention, there are either two or three ethoxy groups on the silane catalyst. However, in accordance with the present invention the alkoxy group can have 1 to about 6 carbon atoms as long as one of the alkoxy groups on the silane catalyst has at least two or more carbon atoms.

In certain embodiments of the present invention, aminopropyltriethoxysilane may be used as the catalyst/co-curing agent/coupling agent, however, in the most preferred embodiments of the present invention, aminopropylmethyldiethoxysilane is used to produce excellent adhesion of the coating composition to the substrate, especially after low temperature exposure. Since the amino- and alkoxy-substituted silane acts as a co-curing agent in the process and compositions of the present invention, it is important in the cross-linking of the dimers, tetramers and oligomers in the curing process. While it is not completely understood, one of the three following possibilities might be at work. It is believed that the di-functional aminopropylmethyldiethoxysilane may form a lower cross-link density and offer more flexibility at the layer of the coating composition immediately at the bond line at the interface of the coating composition and the surface of the substrate to which it is applied. This, in turn, better absorbs strains due to coefficient of thermal expansion mismatch. Alternatively, the aminopropylmethyldiethoxysilane catalyst may demonstrate greater hydrolytic stability than the triethoxy analog, and accordingly, the final coating composition better resists the condensation of moisture that usually occurs on the coatings after they have been exposed to low temperatures, or the decrease in functionality, from three alkoxy groups to two alkoxy groups, allows the aminosilane greater time to segregate at the bondline before being immobilized by gelling with the network.

The amount of catalyst is sufficient as long as there is an effective amount of the catalyst to promote the polymerization of the monomers and to act as a co-curing agent. The catalyst promotes the emulsion hydrolysis and the curing of the coating on the substrate, and since it becomes a part of the final composition, it not only remains in the coating composition but also becomes an integral part thereof after the coating composition has completely cured on the substrate. Further, as indicated above, the silane catalyst becomes non-volatile and non-mobile after it condenses with the polymer network. Generally, in preferred embodiments of the present invention, the amount of silane catalyst is about 0.5% to about 5.0% by weight based on the total weight of the water, n-hexytrimethoxysilane and the methyltrimethoxysilane or, as more generally applied to the improved process of the present invention, based on the total weight of the water and trialkoxysilanes represented by the formula $R—Si(OR)_3$. In the most preferred embodiment of the present invention, the amount of silane catalyst is about 1.0% to about 2.0% by weight based on the total weight of the water, n-hexytrimethoxysilane and methyltrimethoxysilane.

In combining the silane monomers and silane catalyst in preferred embodiments of the present invention with water in order to hydrolyze the monomers, to form a mixture predominately comprised of dimers and tetramers represented by the formulae:

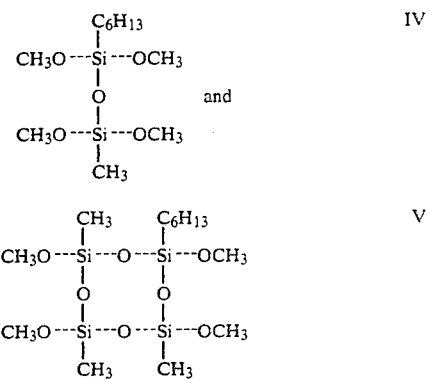

a less than a stoichiometric amount of water is added to the mixture. Generally, in preferred embodiments, from about 10 mole percent to about 95 mole percent based on the total number of moles of silane monomers is added to the composition. In more preferred embodiments, the amount of water present in the process and the moisture-curable polymethyl-n-hexylsilsesquioxane of the present invention represents from about 50 mole percent to about 90 mole percent of the moles of n-hexytrimethoxysilane and methyltrimethoxysilane. In accordance with the present invention, the water is adjustable, and the amount of water can be varied to alter various characteristics, for example, the greater the amount of water, the faster the cure and the thicker the coating.

After the ingredients of the process are combined in accordance with the present invention, the mixture is subjected to ultrasonic agitation. When the mixture of monomers, catalyst and water are placed in an ultrasonic bath, the ingredients form an emulsion. However, when the ingredients of the process are combined with the optional nonionic fluorochemical surfactant, the emulsion may be formed by conventional agitation, for example, high speed stirring and/or by ultrasonic agitation.

In the process of the present invention, it is critical that less than a stoichiometric amount of water be used in the moisture-curable composition. When a stoichiometric amount of water or an excess of water is added to the combined ingredients, and the combined ingredients are placed in an ultrasonic bath to form an emulsion, the water would be sufficient to cure the composition during the formation of the emulsion, therefore, it is not done in the present invention. By using the specific ingredients of the present invention, it has been found that emulsion hydrolysis occurs in an ultrasonic bath without the use of a surfactant as well as it would if a surfactant had been used with conventional mixing.

The mixture of ingredients is agitated ultrasonically for a time sufficient to hydrolyze the silanes to the extent permitted by the less than stoichiometric amount of water present in the composition. Alternatively, the mixture is agitated conventionally and/or ultrasonically for a time sufficient to hydrolyze the silanes to the extent permitted by the less than stoichiometric amount of water present in the composition when optional non-ionic fluorochemical surfactant is used in the mixture. Typically, the agitation of the mixture is maintained for a period of time ranging from about 1 minute to about 2 hours. However, an indication that the emulsion hydrolysis has completed is evident when the cloudiness of the emulsion disappears, and the emulsion clears and becomes transparent. The length of time that the mixture remains in the ultrasonic bath or other mixing means when the optional surfactants are used, is not critical as long as it is a time sufficient to hydrolyze the silanes.

Although it is not necessary to use a surfactant in the process and composition of the present invention, it is considered within the purview of one skilled in the art to add a surfactant to the composition. For example, a non-ionic fluorochemical surfactant, such as a mixture of fluorinated alkyl esters as described in U.S. Pat. No. 4,746,693, may be added to the combined mixture and compositions of the present invention.

When the former emulsion ages for a time sufficient to condense the hydrolyzed silanes to the extent permitted by the amount of water present in the composition, a moisture-curable prepolymer or oligomer of polysilsesquioxane, such as polymethyl-n-hexylsilsesquioxane, is formed. Thus, in accordance with at least some of the objects of the present invention, there is provided a moisture-curable prepolymer or oligomer of polysilsesquioxane, such as polymethyl-n-hexylsilsesquioxane comprising a partially water-hydrolyzed, silane catalyst-containing condensation product of about 10 to about 50 mole percent n-hexyltrimethoxysilane an about 50 to about 90 mole percent methyltrimethoxysilane, the silane catalyst having at least one amino-substituted group, at least one alkoxy-substituted group having at least 2 carbon atoms in the alkoxy group and optionally, an alkyl group, whereby the silane catalyst is a co-curing agent and condenses with the n-hexyltrimethoxysilane and the methyltrimethoxysilane.

Because the composition discussed above contains less than a stoichiometric amount of water (1 mole of water per mole of silane causes gelation and 1.5 moles of water per mole of silane causes full cure), preferably an amount of water representing from about 10 mole percent to about 95 mole percent of the total moles of silane present, the composition is not cured and remains moisture-curable until it is exposed to additional moisture, for example, atmospheric moisture.

The exact makeup of the mixture which contains dimers and tetramers or other oligomers identified above respectively as formulae IV and V, is not known with certainty because it depends, in large measure, on the amount of water utilized to form the moisture-curable polymethyl-n-hexylsilsesquioxane composition. In addition to the dimer, tetramer or oligomers, the mixture contains the co-curing catalyst discussed above and, optionally, a surfactant, and after the hydrolysis emulsion is formed, it may also contain small quantities of unreacted monomers as well as a small quantity of the final resin, as well as the methanol of reaction. This uncured (moisture-curable) mixture is the coating composition of the present invention, and it is stable and can be stored and maintained in one field package. It will be appreciated that the moisture-curable composition of the present invention is stable only when it is maintained in a moisture-free environment.

Upon application to a surface to be protected, the coating composition absorbs moisture from the atmosphere to form a condensed polyalkylsilsesquioxane composition of formula I or a polymethyl-n-hexylsilsesquioxane composition of formula II also containing the silane catalyst as an integral part of the condensation product, with the evolution of a lower alkanol such as methyl alcohol. In general, the majority of alkyl groups on the monomers are methyl, and the hydrolysis/condensation reaction causes the evolution of methanol. This final reaction with moisture takes place on the substrate to form the moisture-cured polyalkylsilsesquioxane, or in preferred embodiments, poly-methyl-n-hexylsilsesquioxane coating.

In mixing or combining the ingredients of the present invention, the optional surfactant can be added to the mixture in either the water or the oil phase, that is, the silane monomer phase, however, it is preferred to incorporate the catalyst in the oil phase since the catalyst is stable only in the oil phase. After all ingredients have been combined and the emulsion has been formed, ultrasonic agitation (and/or other suitable agitation when the optional surfactant is used) of the mixture to maintain an emulsion is continued until hydrolysis of the monomer component is complete to the extent permitted by the amount of water present. The process of the present invention is carried out under ambient conditions, that is, from about 20° C. to about 30° C. The completion of the hydrolysis is evident by the emulsion, which is typically opaque, becoming clear. Generally, from about 1 to about 120 minutes are require complete the hydrolysis/condensation of the monomer, however additional time in the ultrasonic bath (or other agitation as may be used with the optional surfactant) will not produce any adverse results as long as additional moisture is excluded from the emulsion hydrolysis reaction.

The coating compositions of the invention may be formed by partially hydrolyzing a monomer mixture as described above, or by separately hydrolyzing the monomers individually and combining the resultant mixtures, which are predominately dimers, in appropriate quantities. The preparation of individual dimer mixtures from pure monomers may improve the predictability of the composition of the final resin, e.g. the probability of finding adjacent bulky sidegroups is reduced in comparison to the same resin made from a combined mixture of the same monomers. Therefore, steric hindrance can be reduced. The capability to reduce steric hindrance may lead to improvements in the hydrolysis/condensation rate in forming the final resin and also in the resin itself, e.g. the flexibility may be improved.

There is thus-formed a stable coating composition mixture consisting predominately of the dimer and tetramer of formulae IV and V. This mixture may be packaged and utilized without further modification as a coating composition. Upon application to a substrate and exposure to moisture in the air, the catalyst will cause the hydrolysis/condensation of the mixture to go to completion, forming a cured resin coating of the polyalkylsilsesquioxane of formula I or the polymethyl-n-hexylsilsesquioxane of formula II which also has the silane catalyst as an integral part of the polymer itself. Typically, the coating is formed over a period of several days, depending upon relative humidity, e.g. at 35% relative humidity it is tack free after 12-16 hours and fully cured in about seven days.

The coating composition prepared in accordance with this invention may contain additional ingredients conventionally included in such compositions, such as pigments, solvents and viscosity modifiers in conventional amounts, and the like. The coating compositions can contain from about 10 percent to about 45 percent by volume of a suitable pigment. When the subject coating compositions contain a pigment, it is suitably added after the emulsion hydrolysis/condensation reaction is completed since the end point of the reaction, that is the mixture becoming clear, would be masked by the pigment were it already present. When it is contemplated that the coatings will be used on space hardware, it is desirable that conventional ingredients such as solvents and the like, be minimized or eliminated and that any surfactant be kept at a minimum so as to limit outgassing in space to one percent or below.

Because the silane catalyst used in the present invention co-cures with the monomer, tetramer, dimer and the like, network or structure, it becomes non-volatile and non-mobile, and thereby overcomes the disadvantages of outgassing found in the art-recognized coatings.

The following examples further illustrate this invention, it being understood that the invention is in no way intended to be limited to the details described therein. In the Examples, all parts and percentages are on a weight basis and all temperatures are in degrees Celsius, unless otherwise stated.

EXAMPLE 1

An oligomer or prepolymer mixture was prepared by combining 4.66 grams (0.25 mole) of n-hexyltrimethoxysilane with 9.23 grams (0.75 mole) methyltrimethoxysilane, 0.3 gram (2.0% by weight of the total composition) aminopropylmethyldiethoxylsilane and stirred. While stirring, 0.81 gram (0.5 mole) water was added to the mixture. The mixture was placed in a reaction vessel, and the reaction vessel was placed in an ultrasonic water bath until the opaque emulsion cleared, indicating completion of the hydrolysis of the silane monomers. The mixture was aged at ambient temperature in a sealed container overnight.

The mixture was filtered and coated on substrates of unabraded silver and unabraded Kapton (a polyimide film). Kapton is a trademark of EI Dupont and Company. The coating placed upon both the silver substrate and the unabraded Kapton substrate cured tack-free overnight at 50% relative humidity. The samples were fully cured after 7 days. Adhesion to the unabraded Kapton and silver substrates was 5B under tests conducted in accordance with ASTM-D-3359 after testing at room temperature and after exposure to 120° C. for 1 hour and also after exposure at −20° C. for 1 hour. The coating applied to the silver and Kapton was approximately 0.1 mil in thickness.

EXAMPLE 2

In a process similar to that described above for Example 1, 2.92 grams (0.15 mole) hexyltrimethoxysilane and 10.92 grams (0.85 mole) methyltrimethoxysilane were mixed in the presence of 0.3 gram of aminopropylmethyldiethoxysilane catalyst and 0.85 gram (0.5 mole) water. The resulting coating prepared as in Example 1 above, had a 10% mass loss at 750° C. in air at 10° C./minute. This is superior to commercial silicones, such as Dow Corning 93-500 (33.3% mass loss); GE RTV 142 (75.3% mass loss); GE RTV 566 (52% mass loss); and Dow Corning 6-1104 (77.8% mass loss). When the coating of Example 2 was exposed to a fluence of $1.5 \times 10^{20}$ oxygen atoms, the degradation was about 1/50th that of a Kapton polyimide film control and ¼th that of a GE RTV 567 control.

EXAMPLE 3

In a process similar to that of Example 1 above, 4.46 grams of n-hexyltrimethoxysilane (0.25 mole) and 8.83 grams (0.75 mole) of methyltrimethoxysilane and 0.3 gram of aminopropylmethyldiethoxysilane were mixed with 1.40 grams (0.9 mole) water. The resulting mixture was coated on a substrate at approximately 0.5 mil thickness and had a solar absorptivity (on a silver substrate) of 0.06 and a thermal emissivity of 0.69.

Coatings made in accordance with Examples 1–3 above exhibit a UV induced degradation of about 2% in transmission measured at 450 nanometers after exposure to 700 equivalent sun hours compared to 32% degradation in transmission of a control of a GE RTV 567.

The moisture-curable compositions of the present invention are easily applied to substrates by any well-known technique including spraying, brushing, roll applicators, or any other technique conventionally used to place a coating on a substrate. The coatings are easily curable at room temperature, and accordingly can be applied to structures of large size without difficulty. Two-part mixing of ingredients has been avoided by the moisture-curable compositions of the present invention. Furthermore, the compositions of the present invention are non-corrosive, transparent to ultraviolet light so that they do not interfere with solar cells or thermal controlled functions, and they are resistant to high temperatures and abrasion. The compositions of the present invention, since they are already partially oxidized, resist atomic oxygen attack well. The compositions are such that they can be applied in extremely thin layers in liquid form and without waste as unused two part materials must be scrapped. Conventional spray nozzles can be used to apply the moisture-curable compositions of the present invention on objects or films of any size, shape or texture.

While modifications of the invention and variations thereof which may be employed within the scope of the invention have not been described, the invention is intended to include such modifications as may be embraced within the following claims.

I claim:

1. A process of making an improved coating composition comprising:
   a. combining one or more silane monomer represented by the formula R—Si(OR)$_3$ wherein the groups represented by R are the same or different and are lower alkyl containing 1 to about 9 carbon atoms, halolower alkyl containing 1 to about 9 carbon atoms, phenyl, substituted phenyl, phenethyl or methylphenethyl, with the proviso that at least one group represented by R is lower alkyl; an effective amount of a silane catalyst having at least one amino-substituted functional group, at least one alkoxy-substituted group wherein the alkoxy-substituted group has at least 2 carbon atoms in the alkoxy group, and optionally, an alkyl group; an amount of water representing from about 10 to about 95 mole percent of the moles of silane monomer present; and optionally a nonionic fluorochemical surfactant;

b. subjecting the mixture to ultrasonic agitation to form an emulsion; and c. maintaining the emulsion for a time sufficient to hydrolyze partially and condense the silane monomer to the extent permitted by the amount of water present.

2. The process of claim 1, wherein the silane catalyst has the formula:

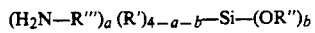

wherein R''' is an amino-substituted functional group; R' is an alkyl group having from 1 to about 4 carbon atoms; R'' is an alkyl group having at least 2 carbon atoms; R''', R' and R'' can be the same or different; and a and b are each an integer from 1 to 3.

3. The process of claim 2, wherein the amino-substituted functional group represented by R''' is selected from the group consisting of 3-aminopropyl, 4-aminobutyl, N-(2-aminoethyl)-3-aminopropyl, 6-aminohexylaminopropyl, p-aminophenyl, 3-(1-aminopropoxy)-3,3-dimethyl-1-propenyl, diethylenetriamine aminoethylaminomethylphenyl, and $H_2N-R^4$ where $R^4$ is equal to R'''.

4. The process of claim 1, wherein the silane catalyst is aminopropylmethyldiethoxysilane.

5. The process of claim 1, wherein the silane catalyst is aminopropyltriethoxysilane.

6. The process of claim 1, wherein the amount of water present represents from about 50 mole percent to about mole percent of the moles of the silane monomer present.

7. The process of claim 1, wherein R—Si(OR)$_3$ is n-hexyltrimethoxysilane monomer and methyltrimethoxysilane monomer and about 10 mole percent to about 50 mole percent n-hexyltrimethoxysilane is combined with about 50 mole percent to about 90 mole percent methyltrimethoxysilane.

8. The process of claim 7, wherein about 15 mole percent to about 25 mole percent n-hexyltrimethoxysilane monomer is combined with about 75 mole percent to about 85 mole percent methyltrimethoxysilane monomer.

9. The process of claim 1, wherein the amount of silane catalyst is about 0.5 percent to about 5.0 percent by weight based on the total weight of silane monomer and water.

10. The process of claim 9, wherein the amount of silane catalyst is about 1.0 percent to about 2.0 percent by weight based on the total weight of silane monomer and water.

11. The process of claim 1, wherein the surfactant comprises a mixture of fluorinate alkyl esters.

12. The process of claim 1, further comprising adding a pigment to the coating composition.

13. A process of making an improved coating composition comprising:

a. combining one or more silane monomer represented by the formula R—Si(OR)$_3$ wherein the groups represented by R are the same or different and are lower alkyl containing 1 to about 9 carbon atoms, halolower alkyl containing 1 to about 9 carbon atoms, phenyl, substituted phenyl, phenethyl or methylphenethyl, with the proviso that at least one group represented by R is lower alkyl; an effective amount of a silane catalyst having at least one amino-substituted functional group, at least one alkoxy-substituted group wherein the alkoxy-substituted group has at least 2 carbon atoms in the alkoxy group, and optionally, an alkyl group; a nonionic fluorochemical surfactant; and an amount of water representing from about 10 to about 95 mole percent of the moles of silane monomer present;

b. agitating the mixture to form an emulsion; and c. maintaining the emulsion for a time sufficient to hydrolyze partially and condense the silane monomer to the extent permitted by the amount of water present.

14. The process of claim 13, wherein the silane catalyst has the formula:

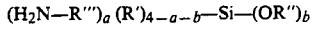

wherein R''' is an amino-substituted functional group; R' is an alkyl group having from 1 to about 4 carbon atoms; R'' is an alkyl group having at least 2 carbon atoms; R''', R' and R'' can be the same or different; and a and b are each an integer from 1 to 3.

15. The process of claim 14, wherein the amino-substituted functional group represented by R''' is selected from the group consisting of 3-aminopropyl, 4-aminobutyl, N-(2-aminoethyl)-3 aminopropyl, 6-aminohexylaminopropyl, p-aminophenyl, 3-(1-aminopropoxy)-3,3-dimethyl-1-propenyl, diethylenetriamine, aminoethylaminomethylphenyl, and $H_2N-R^4$ where $R^4$ is equal to R'''.

16. The process of claim 13, wherein the silane catalyst is aminopropylmethyldiethoxysilane.

17. The process of claim 13, wherein the silane catalyst is aminopropyltriethoxysilane.

18. The process of claim 13, wherein the amount of water present represents from about 50 mole percent to about 90 mole percent of the moles of the silane monomer present.

19. The process cf claim 13, wherein R—Si(OR)$_3$ is n-hexyltrimethoxysilane monomer and methyltrimethoxysilane monomer and about 10 mole percent to about 50 mole percent n-hexyltrimethoxysilane is combined with about 50 mole percent to about 90 mole percent methyltrimethoxysilane.

20. The process of claim 13, wherein the amount of silane catalyst is about 0.5 percent to about 5.0 percent by weight based on the total weight of silane monomer and water.

21. The process of claim 13, wherein the surfactant comprises a mixture of fluorinated alkyl esters.

* * * * *

UNITED STATES PATENT AND TRADEMARK OFFICE
CERTIFICATE OF CORRECTION

PATENT NO. : 5,102,967

DATED : April 7, 1992

INVENTOR(S) : Martin Gerhardt Meder

It is certified that error appears in the above-identified patent and that said Letters Patent is hereby corrected as shown below:

Title page, item [54], and col. 1, line 1, "POLYSILSEQUIOXANE" should read --POLYSILSESQUIOXANE--.

Column 13, line 42, after "about" insert --90--.

Column 14, line 40, "N-(2-aminoethyl)-3 aminopropyl" should be --N-(2-aminoethyl)-3-aminopropyl--.

Signed and Sealed this

Thirteenth Day of July, 1993

Attest:

MICHAEL K. KIRK

*Attesting Officer*     *Acting Commissioner of Patents and Trademarks*